(12) United States Patent
Yin et al.

(10) Patent No.: US 9,897,778 B2
(45) Date of Patent: Feb. 20, 2018

(54) FOUR-SURFACE NARROW FIELD-OF-VIEW COMPOUND LENS

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/993,347

(22) Filed: Jan. 12, 2016

(65) Prior Publication Data

US 2017/0199348 A1  Jul. 13, 2017

(51) Int. Cl.
*G02B 9/00* (2006.01)
*G02B 13/00* (2006.01)
*G02B 27/00* (2006.01)
*G06K 7/14* (2006.01)

(52) U.S. Cl.
CPC ....... *G02B 13/0015* (2013.01); *G02B 13/004* (2013.01); *G02B 13/0005* (2013.01); *G02B 13/006* (2013.01); *G02B 27/0025* (2013.01); *G06K 7/1413* (2013.01)

(58) Field of Classification Search
CPC ................................................. G02B 13/0015
USPC ....................................................... 359/738
See application file for complete search history.

(56) References Cited

U.S. PATENT DOCUMENTS

2010/0046096 A1* 2/2010 Hirao ................... B82Y 20/00
                                                           359/795

OTHER PUBLICATIONS

Office Action corresponding to Taiwanese Patent Application No. 105141218, dated Oct. 17, 2017—provided with English translation.

* cited by examiner

*Primary Examiner* — James Jones
(74) *Attorney, Agent, or Firm* — Lathrope Gage LLP

(57) ABSTRACT

A four-surface narrow field-of-view compound lens includes a first biplanar substrate between a first lens and a second lens, the first lens being plano-convex and the second lens being plano-concave. The compound lens also includes a second biplanar substrate between a third lens and a fourth lens, the third lens being plano-convex and the fourth lens being plano-concave. The second lens and third lens are between the first biplanar substrate and the second biplanar substrate. The first lens, second lens, third lens, and fourth lens are coaxial and are formed of materials having a first, second, third, and fourth Abbe number respectively and focal lengths F1, F2, F3, and F4 respectively. The first Abbe number exceeds the second Abbe number and the third Abbe number exceeds the fourth Abbe number. Ratio F1/F2 may satisfy $-0.32<F1/F2<-0.18$ and ratio F4/F3 may satisfy $-0.72<F4/F3<-0.48$.

15 Claims, 14 Drawing Sheets

| surface | radius $r_c$ (mm) | thickness (mm) | $n_d$ (λ=587.3 nm) | Abbe Number | conic $k$ | aspheric coefficient | | | | |
|---|---|---|---|---|---|---|---|---|---|---|
| | | | | | | 4th-order term $\alpha_4$ | 6th-order term $\alpha_6$ | 8th-order term $\alpha_8$ | 10th-order term $\alpha_{10}$ | |
| 311 | 3.749 | 0.350 | 1.51 | 57 | 0.0 | -0.0079 | 0.0045 | -0.0018 | 0.0002 | |
| 312 | ∞ | 0.000 | -- | -- | -- | -- | -- | -- | -- | |
| 361 | ∞ | 0.400 | 1.52 | 63 | -- | -- | -- | -- | -- | |
| 362 | ∞ | 0.000 | -- | -- | -- | -- | -- | -- | -- | |
| 321 | ∞ | 0.050 | 1.59 | 30 | -- | -- | -- | -- | -- | |
| 322 | 15.000 | 5.729 | -- | -- | 0.0 | -0.0067 | 0.0045 | -0.0020 | 0.0003 | |
| 331 | 2.267 | 0.350 | 1.51 | 57 | 0.0 | -0.0240 | 0.0148 | -0.0205 | 0.0075 | |
| 332 | ∞ | 0.000 | -- | -- | -- | -- | -- | -- | -- | |
| 366 | ∞ | 1.100 | 1.52 | 63 | -- | -- | -- | -- | -- | |
| 341 | ∞ | 0.020 | 1.59 | 30 | -- | -- | -- | -- | -- | |
| 342 | 1.579 | 1.561 | -- | -- | 0.0 | -0.0307 | 0.0261 | -0.0875 | 0.0603 | |
| 351 | ∞ | 0.400 | 1.52 | 63 | -- | -- | -- | -- | -- | |
| 352 | ∞ | 0.040 | -- | -- | -- | -- | -- | -- | -- | |
| 378 | ∞ | 0.000 | -- | -- | -- | -- | -- | -- | -- | |

FIG. 4

| surface | radius $r_c$ (mm) | thickness (mm) | $n_d$ ($\lambda$=587.3 nm) | Abbe Number | conic $k$ | aspheric coefficient | | | |
|---|---|---|---|---|---|---|---|---|---|
| | | | | | | 4th-order term $\alpha_4$ | 6th-order term $\alpha_6$ | 8th-order term $\alpha_8$ | 10th-order term $\alpha_{10}$ |
| 911 | 2.634 | 0.300 | 1.51 | 57 | 0.0 | -0.0079 | 0.0045 | -0.0018 | 0.0002 |
| 912 | ∞ | 0.000 | -- | -- | -- | -- | -- | -- | -- |
| 961 | ∞ | 0.300 | 1.52 | 63 | -- | -- | -- | -- | -- |
| 962 | ∞ | 0.000 | -- | -- | -- | -- | -- | -- | -- |
| 921 | ∞ | 0.050 | 1.59 | 30 | -- | -- | -- | -- | -- |
| 922 | 15.000 | 4.381 | -- | -- | 0.0 | -0.0067 | 0.0045 | -0.0020 | 0.0003 |
| 931 | 1.486 | 0.174 | 1.51 | 57 | 0.0 | -0.0240 | 0.0148 | -0.0205 | 0.0075 |
| 932 | ∞ | 0.000 | -- | -- | -- | -- | -- | -- | -- |
| 966 | ∞ | 0.300 | 1.52 | 63 | -- | -- | -- | -- | -- |
| 941 | ∞ | 0.020 | 1.52 | 50 | -- | -- | -- | -- | -- |
| 942 | 1.052 | 0.722 | -- | -- | 0.0 | -0.0307 | 0.0261 | -0.0875 | 0.0603 |
| 351 | ∞ | 0.400 | 1.52 | 63 | -- | -- | -- | -- | -- |
| 352 | ∞ | 0.040 | -- | -- | -- | -- | -- | -- | -- |
| 378 | ∞ | 0.000 | -- | -- | -- | -- | -- | -- | -- |

FOUR-SURFACE NARROW FIELD-OF-VIEW COMPOUND LENS

BACKGROUND

Digital camera modules are used in a variety of consumer, industrial and scientific imaging devices to produce still images and/or video. Applications of digital camera modules include image-based recognition applications such as barcode scanning and iris recognition. A camera for such applications may include an imaging lens with relatively large depth of field compared to conventional lenses. Such a large depth of field enables a device using the camera to recognize an object to be relatively insensitive to the object's distance from the imaging lens.

For a fixed imaging lens focal length, the depth of field of the imaging lens is approximately linearly proportional to the lens's f-number N, where N is the ratio of the lens's effective length to its entrance pupil diameter D. See, for example, *The Manual of Photography*, 9$^{th}$ ed. by Jacobson et al, Focal Press, 2000. The field of view 2α of a camera with an imaging lens having focal length f and an image sensor with diagonal length d is $$2\alpha = 2\arctan\left(\frac{d}{2f}\right).$$

Expressed in terms of f-number N=f/D, $$\alpha = 2\arctan\left(\frac{d}{2D\cdot N}\right),$$

which illustrates that for a constant entrance pupil diameter D, field of view α decreases as f-number N increases. Since depth of field is approximately linearly proportional to the lens's f-number N, field of view 2α also decreases as depth of field increases.

Image-based recognition devices require a camera module having a lens with a smaller field of view (FOV) than lenses in conventional camera modules, while producing images with line-width resolution minimally reduced compared to images formed by conventional camera modules.

Conventional narrow-FOV camera modules achieve a small point of view while maintaining image quality of a larger FOV camera by employing telescope-like compound lenses that include several optical surfaces. A disadvantage of such camera modules is that the manufacturing cost of a compound lens increases with number of optical surfaces.

SUMMARY OF THE INVENTION

A four-surface narrow field-of-view (FOV) compound lens for producing an image of an object at an image plane of an imaging system is disclosed. In an embodiment, the compound lens includes a first biplanar substrate between a first lens and a second lens, the first lens being plano-convex and the second lens being plano-concave. The compound lens also includes a second biplanar substrate between a third lens and a fourth lens, the third lens being plano-convex and the fourth lens being plano-concave. The first lens, the second lens, the third lens, and the fourth lens have a common optical axis. The second lens and third lens are between the first biplanar substrate and the second biplanar substrate. The first lens has a first planar surface on a first side of the first biplanar substrate and is formed of a material having a first Abbe number. The second lens has a second planar surface on a second side of the first biplanar substrate opposite the first side and is formed of a material having a second Abbe number. The third lens has a third planar surface on a first side of the second biplanar substrate and is formed of a material having a third Abbe number. The fourth lens has a fourth planar surface on a second side of the second biplanar substrate opposite the first side and is formed of a material having a fourth Abbe number. The first Abbe number exceeds the second Abbe number and the third Abbe number exceeds the fourth Abbe number.

In an embodiment, each of the first Abbe number and the third Abbe number exceeds 50 and each of the second Abbe number and the fourth Abbe number is less than 35. In an embodiment, the first lens has a focal length F1, the second lens has a focal length F2, and the ratio F1/F2 satisfies −0.32<F1/F2<−0.18. In an embodiment, the third lens has a focal length F3, the fourth lens has a focal length F4, and the ratio F4/F3 satisfies −0.72<F4/F3<−0.48. In an embodiment, the first lens, the first biplanar substrate, the second lens, the third lens, the second biplanar substrate, and the fourth lens collectively have an effective focal length $f_{\mathit{eff}}$ such that the image is formed at the image plane located a distance T from an intersection of the optical axis and an object-side convex surface of the first lens, and the ratio $f_{\mathit{eff}}/T$ satisfies $0.85<f_{\mathit{eff}}/T<0.95$.

BRIEF DESCRIPTION OF THE FIGURES

FIG. 4 shows a table of exemplary parameters of the compound lens of FIG. 3.

DETAILED DESCRIPTION

Figure 1:
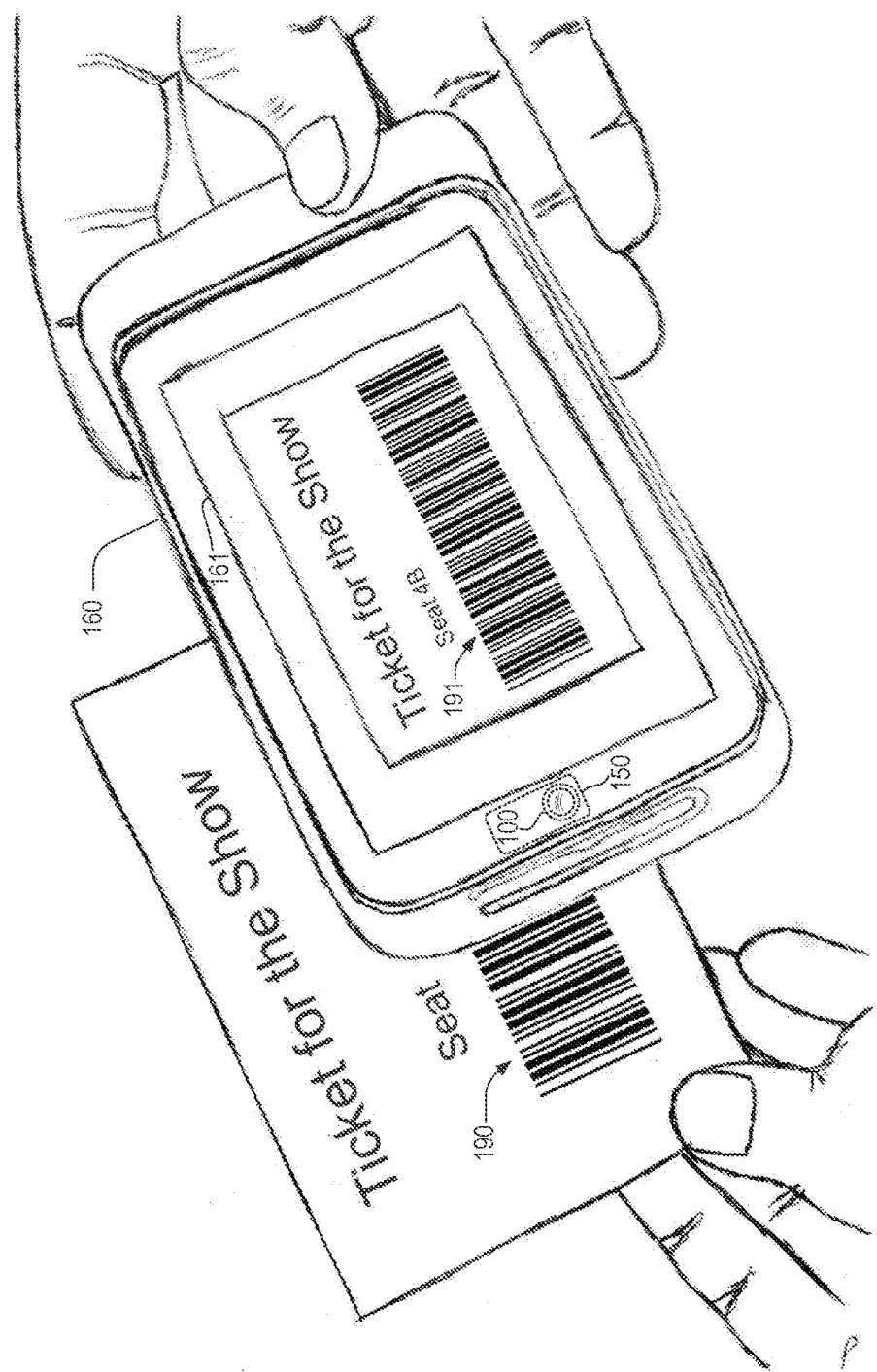
FIG. 1 illustrates an exemplary narrow field-of-view compound lens in a use scenario, according to an embodiment.

FIG. 1 illustrates the imaging of a barcode 190 with a four-surface narrow field-of-view compound lens 100 within a camera module 150 of a mobile device 160. Camera module 150 and compound lens 100 are depicted with dashed lines because they are visible on a side of mobile device 160 facing barcode 190. An image 191 of barcode 190 is shown on output display 161 of mobile device 160. It should be appreciated that narrow field-of-view compound lens 100 may be included in alternate locations on the mobile device 160, such as on the front, back, top, bottom or sides of the device 160. Furthermore, narrow field-of-view compound lens 100 may be included on other devices including, but not limited to, laptop computers, tablet computers, barcode scanners, and image-based recognition devices without departing from the scope hereof.

Figure 2:
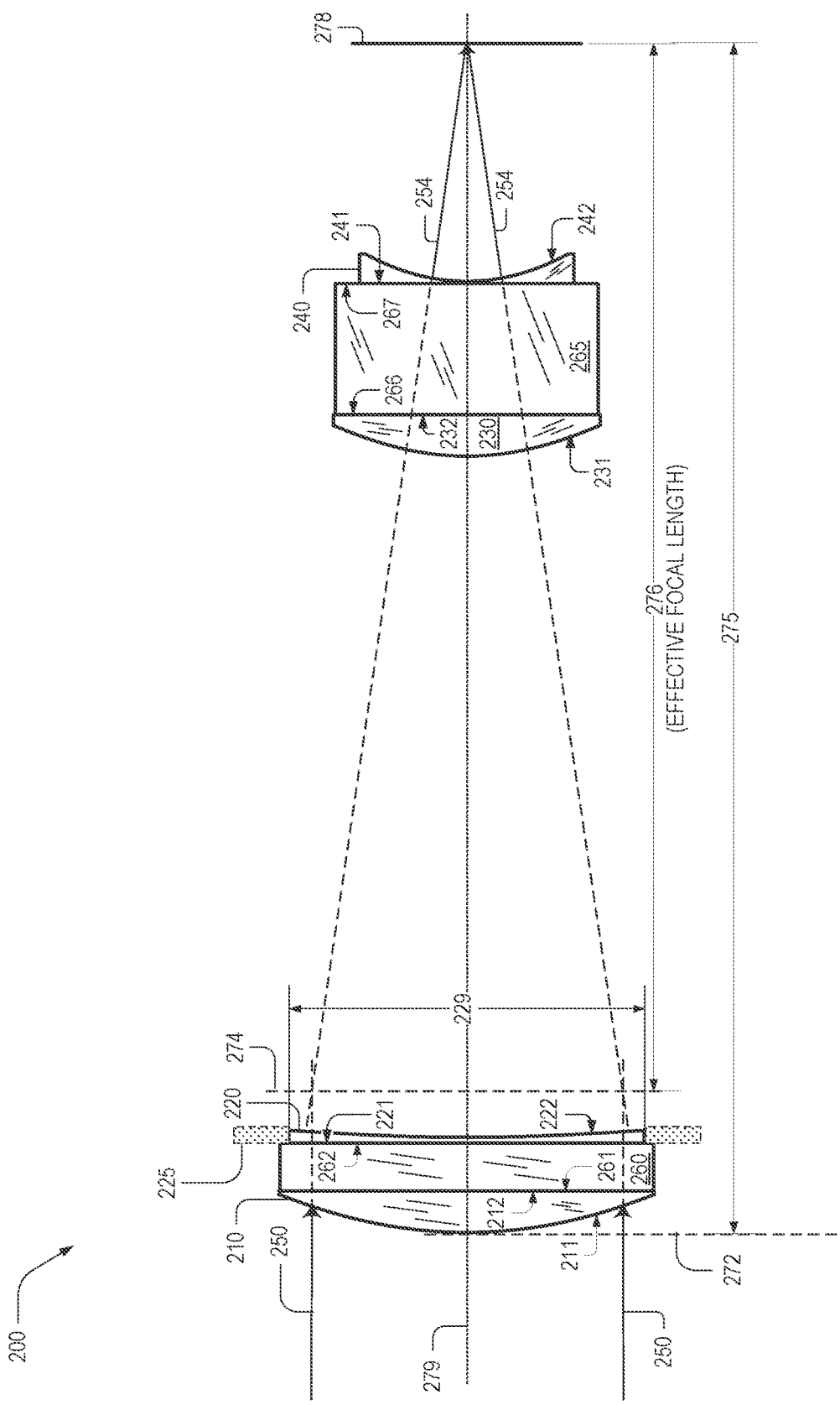
FIG. 2 is an exemplary cross-sectional view of an embodiment of the four-surface narrow field-of-view compound lens of FIG. 1.

FIG. 2 is a cross-sectional view of a four-surface narrow field-of-view compound lens 200, which is an embodiment of four-surface narrow field-of-view compound lens 100 of FIG. 1. Compound lens 200 includes a first biplanar substrate 260 between a first lens 210 and a second lens 220. First lens 210 is a plano-convex lens and second lens 220 is a plano-concave lens. Compound lens 200 also includes a second biplanar substrate 265 between a third lens 230 and a fourth lens 240. Third lens 230 is plano-convex and fourth lens 240 is plano-concave. First lens 210, second lens 220, third lens 230, and fourth lens 240 may have a common optical axis 279. Second lens 220 and third lens 230 are located between first biplanar substrate 260 and second biplanar substrate 265. At least one of substrates 260 and 265 may be monolithic; alternatively, at least one of substrates 260 and 265 may be formed of more than one optical element.

First lens 210 includes a convex surface 211 and a planar surface 212. Planar surface 212 adjoins a planar surface 261 of first biplanar substrate 260, which also includes a planar surface 262. Planar surface 262 adjoins a planar surface 221 of second lens 220, which also includes a concave surface 222. Third lens 230 includes a convex surface 231 and a planar surface 232. Planar surface 232 adjoins a planar surface 266 of second biplanar substrate 265, which also includes a planar surface 267. Planar surface 267 adjoins a planar surface 241 of fourth lens 240, which also includes a concave surface 242.

Pairs of surfaces 212 and 261, 221 and 262, 232 and 266, and 241 and 267 are each shown being in direct contact with each other. Any of the surface pairs may have an optical element therebetween without departing from the scope hereof.

First lens 210, second lens 220, third lens 230, and fourth lens 240 are formed of materials having, respectively, a first Abbe number $V_1$, a second Abbe number $V_2$, a third Abbe number $V_3$, and a fourth Abbe number $V_4$. In compound lens 200, Abbe numbers $V_1$ and $V_3$ may each exceed numbers $V_2$ and $V_4$. Specifically, Abbe numbers $V_1$ and $V_3$ may each exceed 50 and Abbe numbers $V_2$ and $V_4$ may be less than 35.

These constraints on Abbe numbers allow for limiting chromatic aberration in imaging systems that include compound lens 200, such as imaging systems 301 and 901 discussed herein, to values that may be adequately corrected for effective image-based recognition. Images formed by a lenses Abbe numbers outside of this range have chromatic aberration that exceeds a threshold beyond which the aberration cannot be adequately corrected for effective image-based recognition. Herein, all refractive index values and Abbe numbers correspond to $\lambda_d$=587.6 nm unless otherwise specified.

Transparent optical materials with $V_d$>50 include polymethyl methacrylate (PMMA), alicyclic acrylate (e.g., Optrez OZ1330®), and cycloolefin polymers (e.g., APEL™ 5014DP, TOPAS® 5013, and ZEONEX® 480R). The lens material with $V_d$>50 may be plastic or non-plastic optical material, such as glass, without departing from the scope hereof.

Transparent optical materials with $V_d$<35 include PANLITE®, a brand-name polycarbonate, Udel® P-1700, a brand-name polysulfone, and OKP-4, a brand-name optical polyester. The lens material with $V_d$<35 may be plastic or a non-plastic optical material, such as glass without departing from the scope hereof.

Lenses 210, 220, 230, and 240 may be formed of a solder-reflow compatible material via a wafer-level optics replication process. Lenses 210 and 230 may also be formed via injection molding or other methods known in the art. Alternatively, lenses 210 and 230 may be formed of glass via precision glass molding (also known as ultra-precision glass pressing) or other methods known in the art.

At least one of lenses 210, 220, 230, and 240 may be a singlet lens. At least one of lenses 210, 220, 230, and 240 may be a non-singlet lens without departing from the scope hereof. At least one of surfaces 211, 222, 231, and 242 may be an aspheric surface. At least one of surfaces 211, 222, 231, and 242 may be a spherical surface without departing from the scope hereof.

Surface 211 of first lens 210 may be optimized to collect incident rays, control the propagation direction of those rays into compound lens 200, such as through lenses 210, 220, 230, and 240, and guide the incident rays passing through an aperture stop 225. Surface 222 of second lens 220 may be optimized to correct the chromatic aberration and spherical aberration of an image formed by compound lens 200. In FIG. 2, aperture stop 225 is illustrated an opaque aperture for illustrative purposes. Alternatively, aperture stop 225 may be a physical aperture is depicted in FIG. 2.

Used in an imaging system, compound lens 200 may have aperture stop 225 between substrate 260 and second lens 220, which corresponds to a plane between adjoining surfaces 262 and 221. Locating aperture stop 225 within compound lens 200 helps to maintain symmetry of ray cones from field coordinates, which decreases selected aberrations and contributes to the imaging system having an optimal modulation transfer function ("MTF").

First lens 210 has a focal length F1 and second lens 220 has a focal length F2. Embodiments of compound lens 200 may have a quotient F1/F2 between −0.32 and −0.18. Limiting the quotient F1/F2 to this range allows for limiting chromatic and spherical aberration in an image formed by compound lens 200 to values that may be adequately corrected for effective image-based recognition. Images formed by a lens with quotient F1/F2 outside of this range have chromatic and spherical aberrations that exceed a threshold beyond which the aberrations cannot be adequately corrected for effective image-based recognition.

Third lens 230 has a focal length F3 and fourth lens 240 has a focal length F4. Embodiments of compound lens 200 may have a quotient F4/F3 between −0.72 and −0.58. Limiting the quotient F4/F3 to this range allows for limiting aberrations such as coma, astigmatism, and distortion in an image formed by compound lens 200 to values that may be adequately corrected for effective image-based recognition. Images formed by a lens with quotient F4/F3 outside of this range have aberrations that exceed a threshold beyond which the aberrations cannot be adequately corrected for effective image-based recognition.

FIG. 2 shows compound lens 200 focusing parallel rays 250 onto an image plane 278. Converging rays 254 exit compound lens 200 at surface 242 and converge at image plane 278. Extensions of rays 250 and 254 into compound lens 200 intersect at a principal plane 274. FIG. 2 shows principal plane 274 intersecting optical axis 279 between surfaces 222 and 232. Without departing from the scope hereof, embodiments of compound lens 200 may have principal plane 274 that intersects optical axis 279 within one of lenses 210, 220, 230, and 240, and substrates 260 and 265.

Compound lens 200 has an effective focal length 276 (herein also denoted by $f_{eff}$), between principal plane 274 and image plane 278. A plane 272 is tangent to surface 211 at optical axis 279 and perpendicular to optical axis 279. Total track length 275 defines a distance T between plane 272 and image plane 278. Embodiments of compound lens 200 may have a quotient $f_{eff}/T$ between 0.88 and 0.95. Limiting the quotient $f_{eff}/T$ to this range limits the length of an imaging system that includes compound lens 200.

Four-Surface Narrow Field-of-View Compound Lens, Example 1

Figure 3:
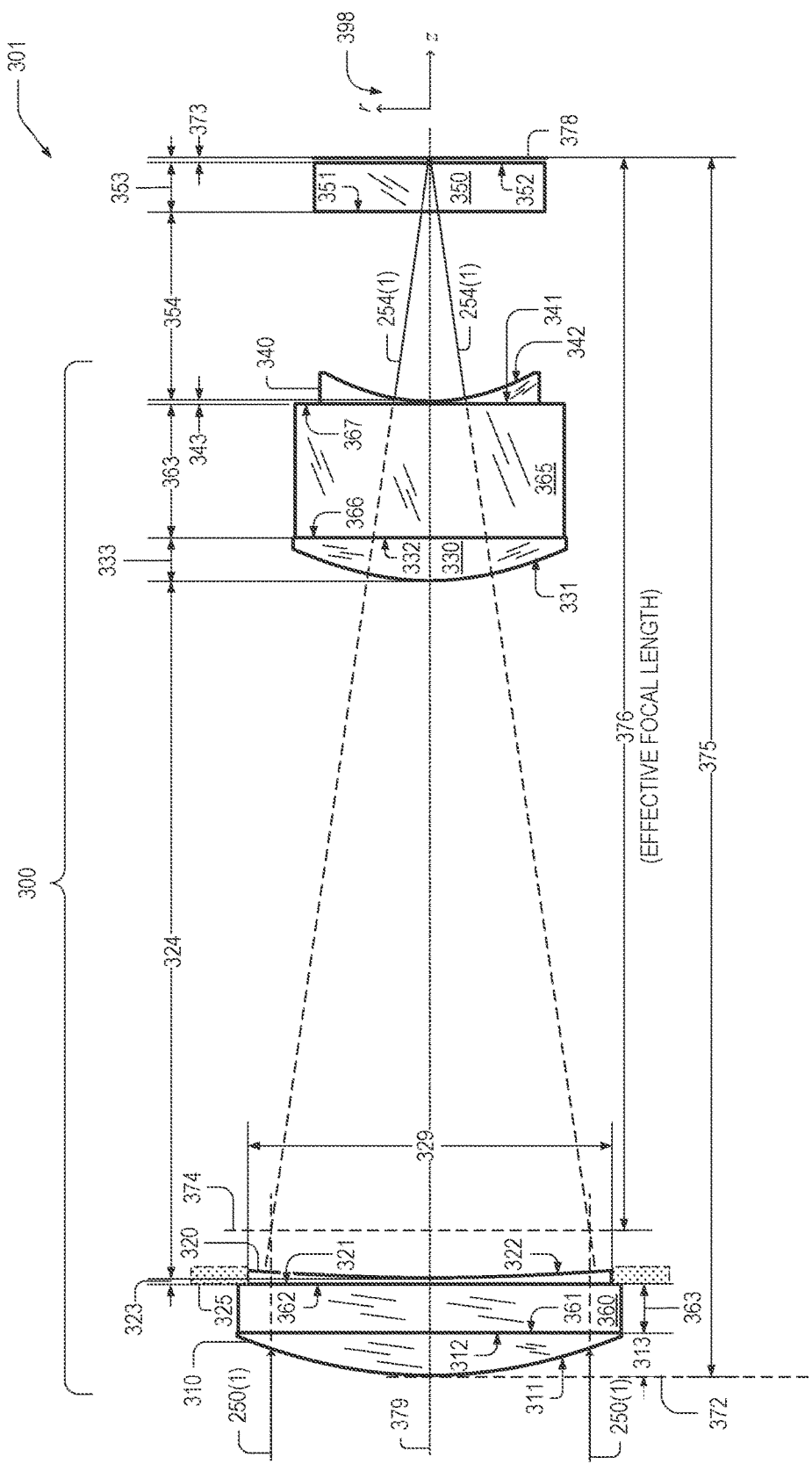
FIG. 3 is a cross-sectional view of an imaging system showing an embodiment of the four-surface narrow field-of-view compound lens of FIGS. 1 and 2, in relationship to a coverglass of an imager.

FIG. 3 is a cross-sectional view of a four-surface narrow field-of-view compound lens 300 within an imaging system 301. Compound lens 300 is an embodiment of four-surface narrow field-of-view compound lens 200. Compound lens 300 includes a substrate 360 between a first lens 310 and a second lens 320. Compound lens 300 also includes a substrate 365 between a third lens 330 and a fourth lens 340. Lenses 310, 320, 330, and 340 have a common optical axis 379 (and are thus coaxial) and are examples of lenses 210, 220, 230, and 240, respectively, of compound lens 200. Substrates 360 and 365 are examples of substrates 260 and 265, respectively, of compound lens 200. Compound lens 300 has an aperture stop 325. Diameter 329 is 2.98 mm. Aperture stop 325 and diameter 329 are similar to aperture stop 225 and diameter 229 of compound lens 200.

First lens 310 includes a convex surface 311 and a planar surface 312. Planar surface 312 adjoins a planar surface 361 of substrate 360, which also includes a planar surface 362. Planar surface 362 adjoins a planar surface 321 of second lens 320, which also includes a concave surface 322. Third lens 330 includes a convex surface 331 and a planar surface 332. Planar surface 332 adjoins a planar surface 366 of substrate 365, which also includes a planar surface 367. Planar surface 367 adjoins a planar surface 341 of second lens 340, which also includes a concave surface 342. Surfaces 311, 312, 361, 362, 321, 322, 331, 332, 366, 367, 341, and 342 are examples of surfaces 211, 212, 261, 262, 221, 222, 231, 232, 266, 267, 241, and 242, respectively.

Imaging system 301 may also include a cover glass 350. Cover glass 350 includes surfaces 351 and 352 and covers a pixel array of an image sensor, not shown, located at an image plane 378. The specific type of pixel array and image sensor may vary and is thus not discussed in detail herein.

FIG. 4 shows a table 400 of exemplary parameters of each surface of compound lens 300. Table 400 includes columns 404, 406, 408, 410, and 421-426. Surface column 421 denotes surfaces 311, 312, 361, 362, 321, 322, 331, 332, 366, 341, 342, 351, 352, and image plane 378 shown in FIG. 3. Column 423 includes on-axis thickness values, in millimeters, between adjacent surfaces of imaging system 301. Column 423 includes center thicknesses of first lens 310, substrate 360, and second lens 320. Specifically, first lens 310 has a center thickness 313 equal to 0.350 mm, substrate 360 has a center thickness 363 equal to 0.400 mm, and second lens 320 has a center thickness 323 equal to 0.050 mm. Surface 322 of second lens 320 and surface 331 of third lens 330 are separated by a distance 324 equal to 5.729 mm.

Column 423 also includes center thicknesses of third lens 330, substrate 365, fourth lens 340, and cover glass 350. Specifically, third lens 330 has a center thickness 333 equal to 0.350 mm, substrate 365 has a center thickness 363 equal to 1.100 mm, lens 340 has a center thickness 343 equal to 0.020 mm. Surface 342 of fourth lens 340 and surface 351 of cover glass 350 are separated by a distance 354 equal to 1.561 mm.

Cover glass 350 has a thickness 353 equal to 0.400 mm. Surface 352 of coverglass 350 and image plane 378 are separated by a distance 373 equal to 0.040 mm. It should be appreciated that imaging system 301 need not include cover glass 350, in which case parameters of compound lens 300 may be reoptimized to form an image at image plane 378 absent cover glass 350.

Surfaces 311, 322, 331, and 342 are defined by surface sag $z_{sag}$, shown in Eqn. 1.

$$z_{sag} = \frac{cr^2}{1 + \sqrt{1 - (1+k)c^2r^2}} + \sum_{i=1}^{N} \alpha_i r^i \qquad (1)$$

In Eqn. 1, $z_{sag}$ is a function of radial coordinate r, where directions z and r are shown in coordinate axes 398, FIG. 3. In Eqn. 1, the parameter c is the reciprocal of the surface radius of curvature $$r_c : c = \frac{1}{r_c}.$$

Column 422 of FIG. 4 lists $r_c$ values for surfaces 311, 322, 331, and 342. Parameter k denotes the conic constant, shown in column 426. Columns 404, 406, 408, and 410 contain values of aspheric coefficients $\alpha_4$, $\alpha_6$, $\alpha_8$, and $\alpha_{10}$ respectively. The units of quantities in FIG. 3 are consistent with $z_{sag}$ in Eqn. 1 being expressed in millimeters.

Column 424 lists the material's refractive index $n_d$ at free-space wavelength $\lambda_d$=587.6 nm, and column 425 lists the corresponding Abbe numbers $V_d$. First lens 310 has refractive index $n_d$=1.511, Abbe number $V_d$=57, and includes object-side surface 311 and image-side surface 312. Substrate 360 has refractive index $n_d$=1.52, Abbe number $V_d$=63, and includes object-side surface 361 and image-side surface 362. Second lens 320 has refractive index $n_d$=1.59, Abbe number $V_d$=30, and includes object-side surface 321 and image-side surface 322. Third lens 330 has refractive index $n_d$=1.51, Abbe number $V_d$=57, and includes object-side surface 331 and image-side surface 322. Fourth lens 340 has refractive index $n_d$=1.59, Abbe number $V_d$=30, and includes object-side surface 341 and image-side surface 342.

Compound lens 300 has a total track length 375 equal to 10.000 mm, which is the sum of thickness values in column 423 of table 400. Referring to FIG. 3, total track length 375 is between plane 372 and image plane 378, where plane 372 is tangent to surface 311 at optical axis 379. Extensions of rays 250(1) and 254(1) into compound lens 300 intersect at a principal plane 374.

At free-space wavelength $\lambda$=587.6 nm, compound lens 300 has an effective focal length 376 ($f_{eff}$) equal to 8.88 mm between principal plane 374 and image plane 378. Principal plane 374, total track length 375 and effective focal length 376 are similar to principal plane 274, total track length 275 and effective focal length 276, respectively. The ratio of total track length 375 to effective focal length 376 equals 0.888. Compound lens 300 has a working f-number equal to 3.0 and, for an image sensor with a 1.7-mm diagonal length, a 10-degree field of view.

First lens 310 and second lens 320 have focal lengths F1 and F2 respectively, which may be approximated using the lensmaker's equation. Referring to first lens 310, object-side surface 311 has a 3.749-mm radius of curvature, and image-side surface 312 is planar hence has an infinite radius of curvature. Using these radii of curvature, center thickness 313, and $n_d$=1.51, the lensmaker's equation yields F1≈7.35 mm. Referring to second lens 320, object-side surface 321 is planar and hence has an infinite radius of curvature, and image-side surface 322 has a 15.000-mm radius of curvature. Using these radii of curvature, center thickness 323, and $n_d$=1.595, the lensmaker's equation yields F2≈−25.42 mm. Ratio F1/F2≈−0.289.

Third lens 330 and fourth lens 340 have focal lengths F3 and F4 respectively. Referring to third lens 330, object-side surface 331 has a 1.486-mm radius of curvature, and image-side surface 332 is planar hence has an infinite radius of curvature. Using these radii of curvature, center thickness 333, and $n_d$=1.51, the lensmaker's equation yields F3≈4.45 mm. Referring to fourth lens 340, object-side surface 341 is planar and hence has an infinite radius of curvature, and image-side surface 342 has a 1.052-mm radius of curvature. Using these radii of curvature, center thickness 343, and $n_d$=1.59, the lensmaker's equation yields F4≈−2.68 mm. Ratio F4/F3≈−0.602.

FIGS. 5-8 are plots of longitudinal aberration, f-theta distortion, field curvature, and lateral color, respectively, of compound lens 300 within imaging system 301 as computed by Zemax®.

Figure 5:
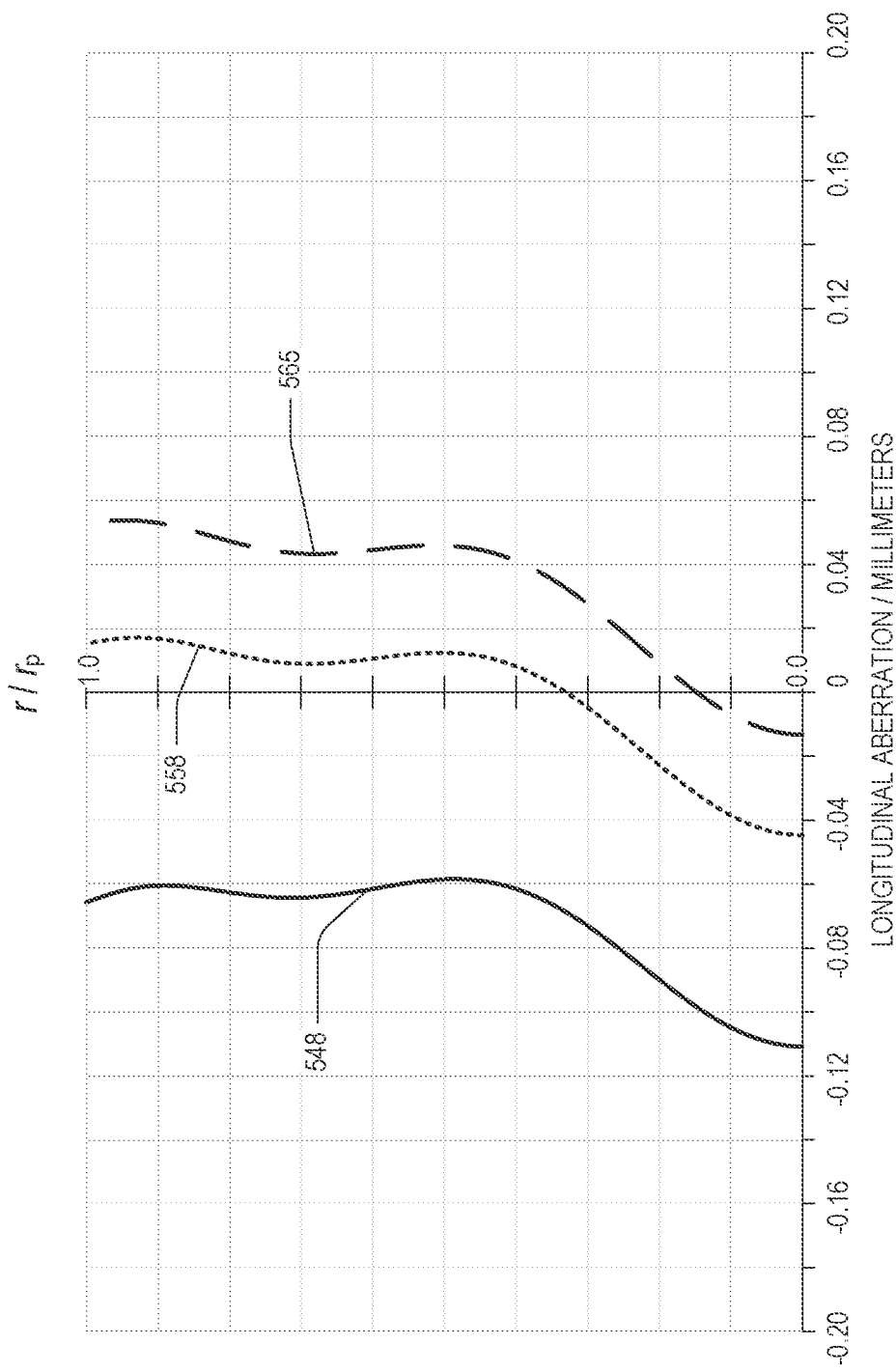
FIG. 5 is a plot of the longitudinal aberration of the compound lens within the imaging system of FIG. 3.

FIG. 5 is a plot of the longitudinal aberration of compound lens 300 within imaging system 301. In FIG. 5, longitudinal aberration is plotted in units of millimeters as a function of normalized radial coordinate $r/r_p$, where $r_p$=1.5979 mm is the maximum entrance pupil radius. Longitudinal aberration curves 548, 558, and 565 are computed at the blue, green, and red Fraunhofer F-, d- and C-spectral lines: $\lambda_F$=486.1 nm, $\lambda_d$=587.6 nm, and $\lambda_C$=656.3 nm respectively.

Figure 6:
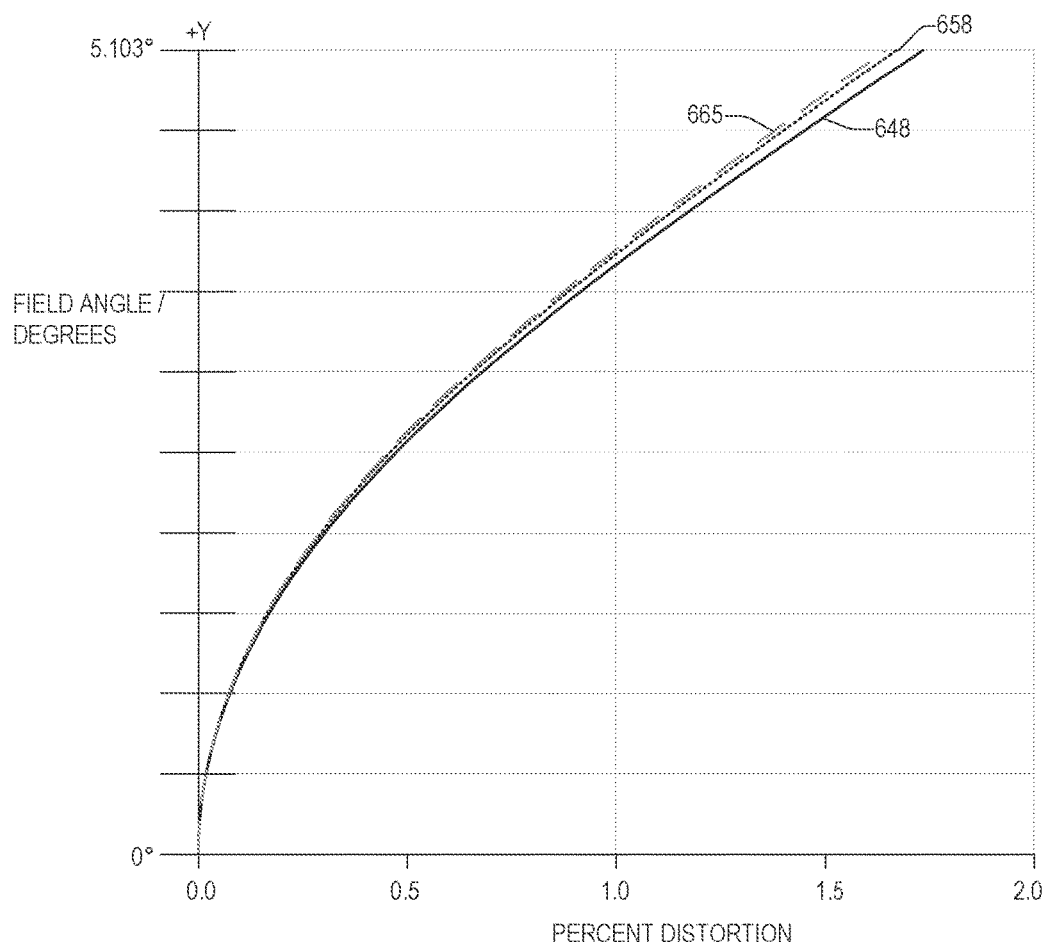
FIG. 6 is a plot of the f-theta distortion of the compound lens within the imaging system of FIG. 3.

FIG. 6 is a plot of the f-theta distortion, versus field angle, of compound lens 300 within imaging system 301. The maximum field angle plotted in FIG. 6 is $\theta_{max}$=5.103°. Distortion curves 648, 658, and 665 are computed at wavelengths $\lambda_F$, $\lambda_d$, and $\lambda_C$, respectively.

Figure 7:
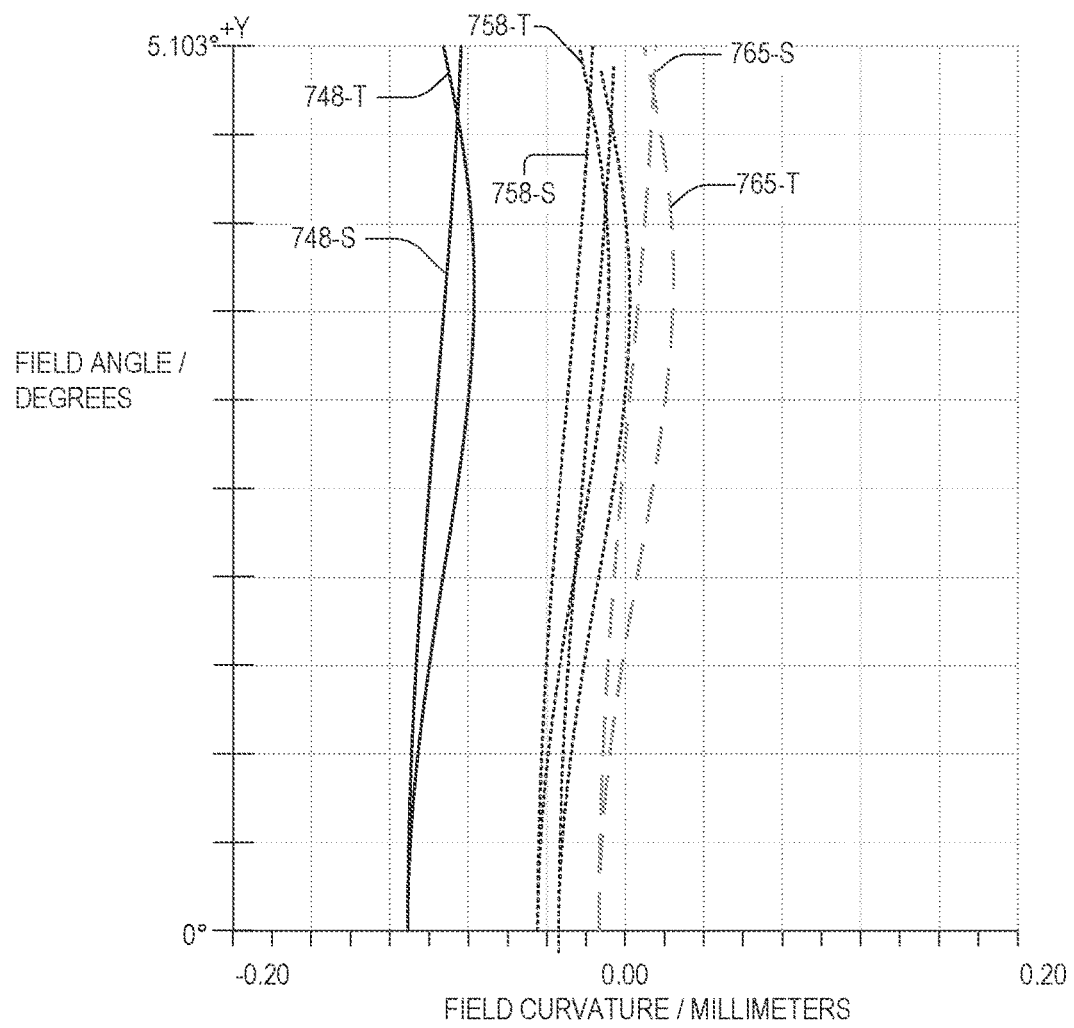
FIG. 7 is a plot of the Petzval field curvature of the compound lens within the imaging system of FIG. 3.

FIG. 7 is a plot of the Petzval field curvature, as a function of field angle, of compound lens 300 within imaging system 301. The field curvature is plotted for field angles between zero and $\theta_{max}$=5.103°. Field curvature 748-S and field curvature 748-T (solid lines) are computed at wavelength $\lambda_F$ in the sagittal and tangential planes, respectively. Field curvature 758-S and field curvature 758-T (short-dashed lines) are computed at wavelength $\lambda_d$ in the sagittal and tangential planes, respectively. Field curvature 765-S and field curvature 765-T (long-dashed lines) correspond to field curvature at wavelength $\lambda_C$ in the sagittal and tangential planes, respectively.

Figure 8:
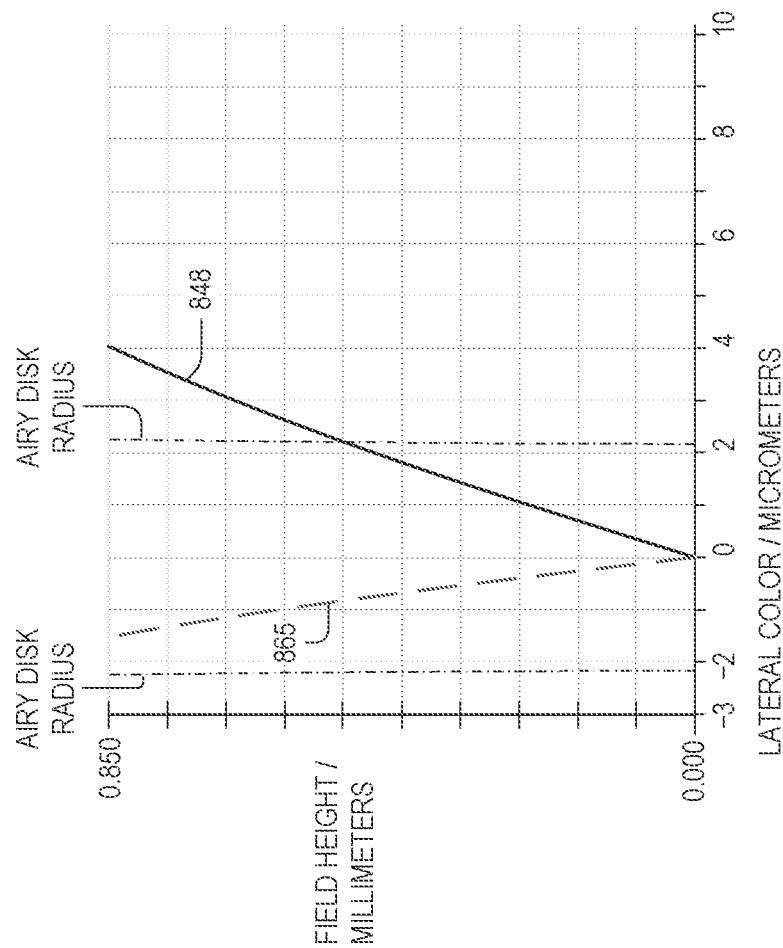
FIG. 8 is a plot of the lateral color error of the compound lens within the imaging system of FIG. 3.

FIG. 8 is a plot of the lateral color error, also known as transverse chromatic aberration, versus field height of compound lens 300 within imaging system 301. Field height ranges from $h_{min}$=0 (on-axis) to $h_{max}$=0.850 mm in image plane 378 Lateral color is referenced to the yellow d Fraunhofer line of helium, $\lambda_d$=587.6 nm: the lateral color for $\lambda_d$ is zero for all field heights. Lateral color 848 is computed at wavelength $\lambda_F$. Lateral color 865 is computed at wavelength $\lambda_C$.

Four-Surface Narrow Field-of-View Compound Lens, Example 2

Figure 9:
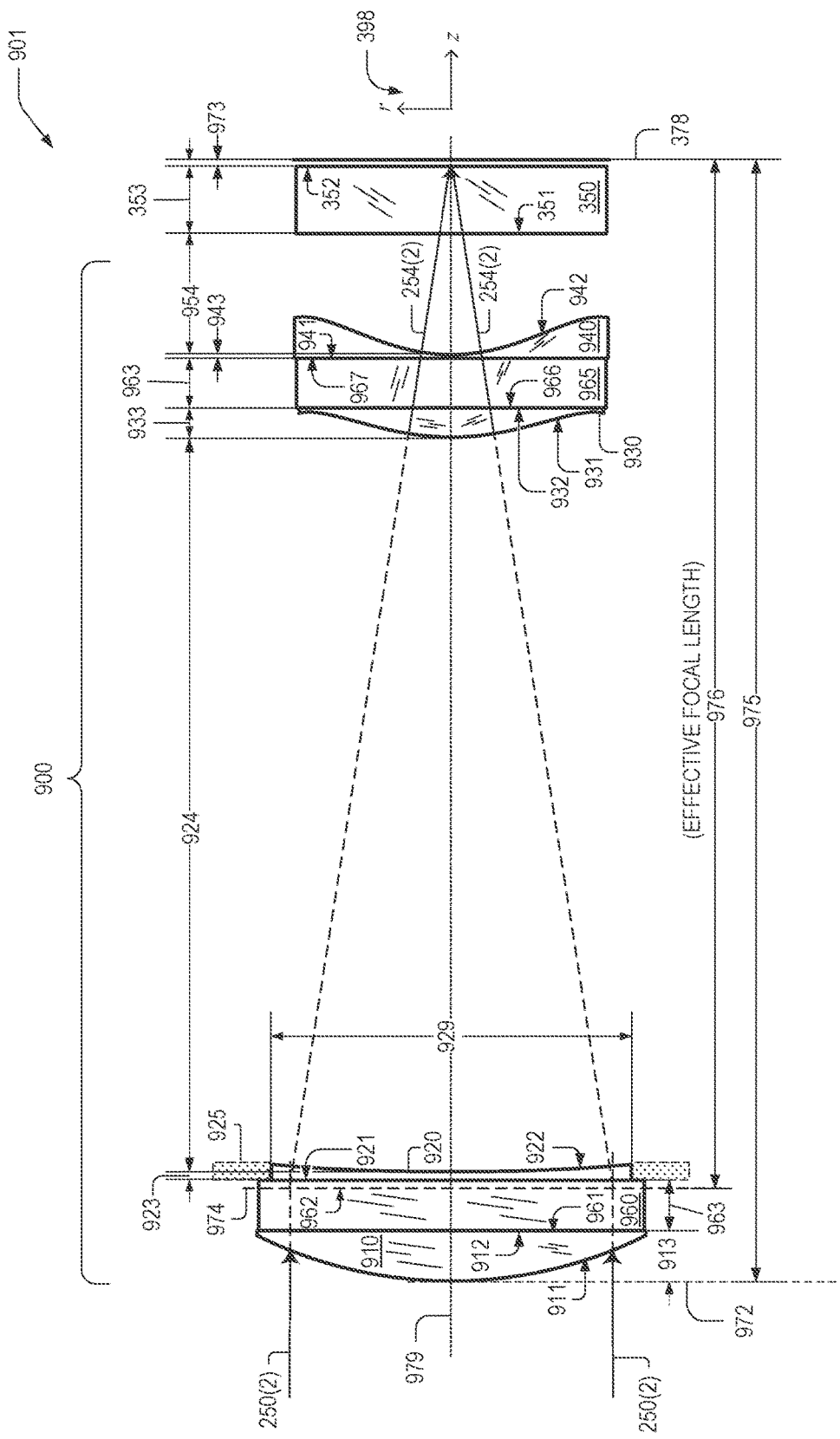
FIG. 9 is a cross-sectional view of an imaging system showing an embodiment of the four-surface narrow field-of-view compound lens of FIGS. 1 and 2, in relationship to a coverglass of an imager.

FIG. 9 is a cross-sectional view of a four-surface narrow field-of-view compound lens 900 within an imaging system 901. Compound lens 900 is an embodiment of four-surface narrow field-of-view compound lens 200. Compound lens 900 includes a substrate 960 between a first lens 910 and a second lens 920. Compound lens 900 also includes a substrate 965 between a third lens 930 and a fourth lens 940. Lenses 910, 920, 930, and 940 have a common optical axis 979 and are examples of lenses 210, 220, 230, and 240, respectively, of compound lens 200. Substrates 960 and 965 are examples of substrates 260 and 265, respectively, of compound lens 200. Compound lens 900 has an aperture stop 925. Diameter 929 is 2.16 mm. Aperture stop 925 and diameter 929 are similar to aperture stop 225 and diameter 229 of compound lens 200.

First lens 910 includes a convex surface 911 and a planar surface 912. Planar surface 912 adjoins a planar surface 961 of substrate 960, which also includes a planar surface 962. Planar surface 962 adjoins a planar surface 921 of second lens 920, which also includes a concave surface 922. Third lens 930 includes a convex surface 931 and a planar surface 932. Planar surface 932 adjoins a planar surface 966 of substrate 965, which also includes a planar surface 967. Planar surface 967 adjoins a planar surface 941 of fourth lens 940, which also includes a concave surface 942. Surfaces 911, 912, 961, 962, 921, 922, 931, 932, 966, 967, 941, 942 are examples of surfaces 211, 212, 261, 262, 221, 222, 231, 232, 266, 267, 241, 242, respectively. In addition to including compound lens 900, imaging system 901 also includes cover glass 350.

Figure 10:
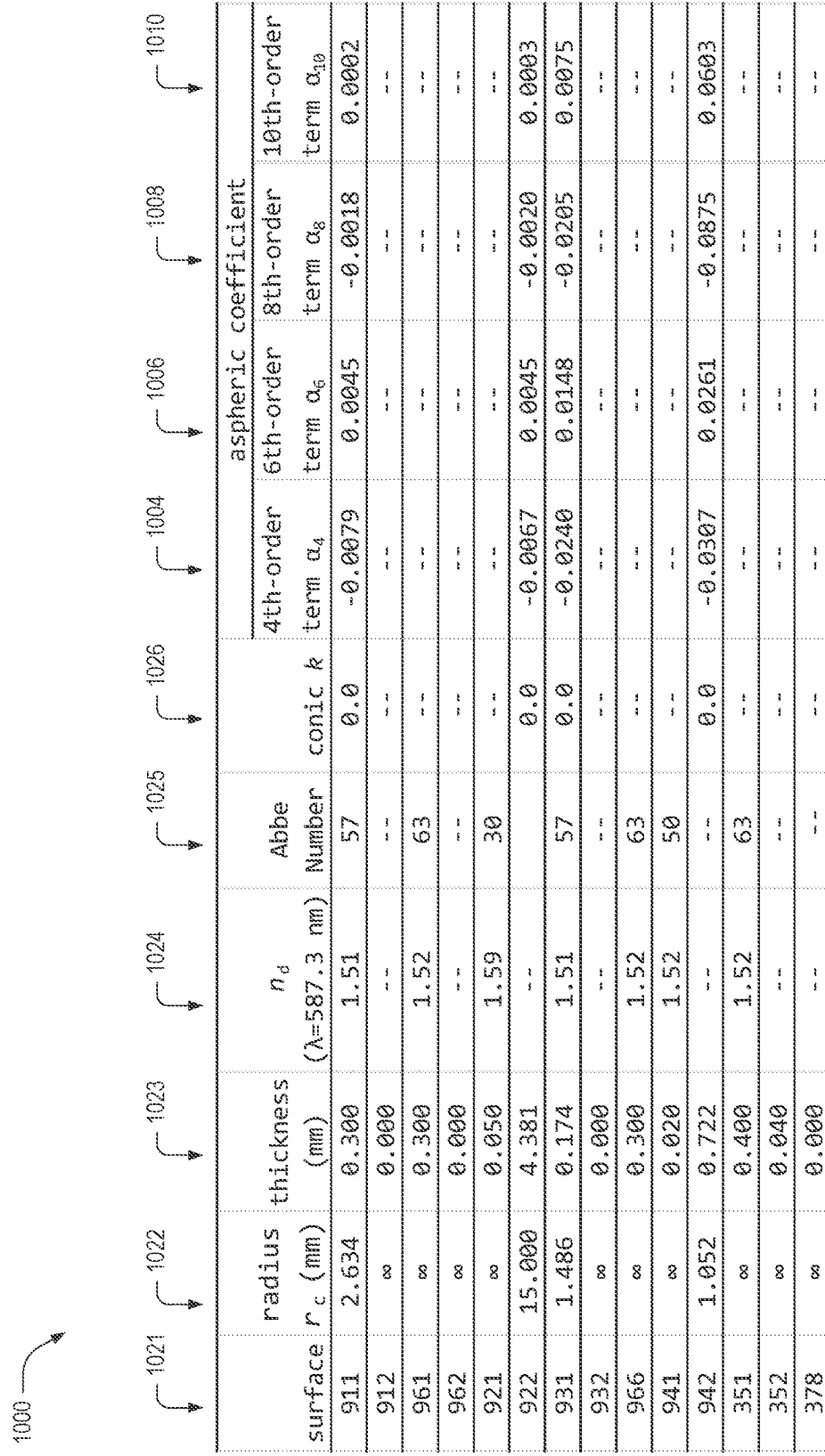
FIG. 10 shows a table of exemplary parameters of the compound lens of FIG. 9.

FIG. 10 shows a table 1000 of exemplary parameters of each surface of compound lens 900. Table 1000 includes columns 1004, 1006, 1008, 1010, and 1021-1026. Surface column 1021 denotes surfaces 911, 912, 961, 962, 921, 922, 931, 932, 966, 941, 942, 351, 352, and image plane 378 shown in FIG. 9. Column 1023 includes on-axis thickness values, in millimeters, between adjacent surfaces of imaging system 901. Column 1023 includes center thicknesses of first lens 910, substrate 960, and second lens 920. Specifically, first lens 910 has a center thickness 913 equal to 0.300 mm, substrate 960 has a center thickness 923 equal to 0.300 mm, second lens 920 has a center thickness 923 equal to 0.050 mm. Surface 922 of second lens 920 and surface 931 of third lens 930 are separated by a distance 924 equal to 4.381 mm.

Column 1023 also includes center thicknesses of third lens 930, substrate 965, fourth lens 940, and cover glass 350. Specifically, third lens 930 has a center thickness 933 equal to 0.174 mm, substrate 960 has a center thickness 963 equal to 0.300 mm, fourth lens 940 has a center thickness 943 equal to 0.020 mm. Surface 942 of fourth lens 940 and surface 351 of cover glass 350 are separated by a distance 954 equal to 0.722 mm. Surface 352 of coverglass 350 and image plane 378 are separated by distance 373.

It should be appreciated that imaging system 901 need not include cover glass 350, in which case parameters of compound lens 900 may be reoptimized to form an image at image plane 378 absent cover glass 350.

Surfaces 911, 922, 931, and 942 are defined by surface sag $z_{sag}$, shown in Eqn. 1. Column 1022 of FIG. 10 lists $r_c$ values for surfaces 911, 922, 931, and 942. Parameter k denotes the conic constant, shown in column 1026. Columns 1004, 1006, 1008, and 1010 contain values of aspheric coefficients $\alpha_4$, $\alpha_6$, $\alpha_8$, and $\alpha_{10}$ respectively. The units of quantities in FIG. 9 are consistent with $z_{sag}$ in Eqn. 1 being expressed in millimeters.

Column 1024 lists the material's refractive index $n_d$ at free-space wavelength $\lambda$=587.6 nm, and column 1025 lists the corresponding Abbe numbers $V_d$. First lens 910 has refractive index $n_d$=1.511, Abbe number $V_d$=57, and includes object-side surface 911 and image-side surface 912. Substrate 960 has refractive index $n_d$=1.52, Abbe number $V_d$=63, and includes object-side surface 961 and image-side surface 962. Second lens 920 has refractive index $n_d$=1.59, Abbe number $V_d$=30, and includes object-side surface 921 and image-side surface 922. Third lens 930 has refractive index $n_d$=1.51, Abbe number $V_d$=57, and includes object-side surface 931 and image-side surface 932. Fourth lens 940 has refractive index $n_d$=1.51, Abbe number $V_d$=63, and includes object-side surface 941 and image-side surface 942.

Compound lens 900 has a total track length 975 equal to 6.687 mm, which is the sum of thickness values in column 1023 of table 1000. Referring to FIG. 9, total track length 975 is between plane 972 and image plane 378, where plane 972 is tangent to surface 911 at optical axis 979. Extensions of rays 250(2) and 254(2) into compound lens 900 intersect at a principal plane 974.

At free-space wavelength $\lambda_d$=587.6 nm, compound lens 900 has an effective focal length 976 ($f_{eff}$) equal to 6.156 mm between principal plane 974 and image plane 378. Principal plane 974, total track length 975 and effective focal length 976 are similar to principal plane 274, total track length 275 and effective focal length 276, respectively. The ratio of total track length 975 to effective focal length 976 equals 0.921. Compound lens 900 has a working f-number equal to 2.8 and, for an image sensor with a 1.7-mm diagonal length, a 15-degree field of view.

First lens 910 and second lens 920 have focal lengths F1 and F2 respectively, which may be approximated using the lensmaker's equation. Referring to first lens 910, object-side surface 911 has a 9.749-mm radius of curvature, and image-side surface 912 is planar hence has an infinite radius of curvature. Using these radii of curvature, center thickness 913, and $n_d$=1.51, the lensmaker's equation yields F1≈5.17 mm. Referring to second lens 920, object-side surface 921 is planar and hence has an infinite radius of curvature, and image-side surface 922 has a 15.000-mm radius of curvature. Using these radii of curvature, center thickness 923, and $n_d$=1.595, the lensmaker's equation yields F2≈−25.42 mm. Ratio F1/F2=−0.203.

Third lens 930 and fourth lens 940 have focal lengths F3 and F4 respectively. Referring to third lens 930, object-side surface 931 has a 1.486-mm radius of curvature, and image-side surface 932 is planar hence has an infinite radius of curvature. Using these radii of curvature, center thickness 933, and $n_d$=1.51 in the lensmaker's equation yields F3≈2.91 mm. Referring to fourth lens 940, object-side surface 941 is planar and hence has an infinite radius of curvature, and image-side surface 942 has a 1.052-mm radius of curvature. Using these radii of curvature, center thickness 943, and $n_d$=1.59, the lensmaker's equation yields F4≈−2.02 mm. Ratio F4/F3=31 0.694.

FIGS. 11-14 are plots of longitudinal aberration, f-theta distortion, field curvature, and lateral color, respectively, of compound lens 900 within imaging system 901 as computed by Zemax®.

Figure 11:
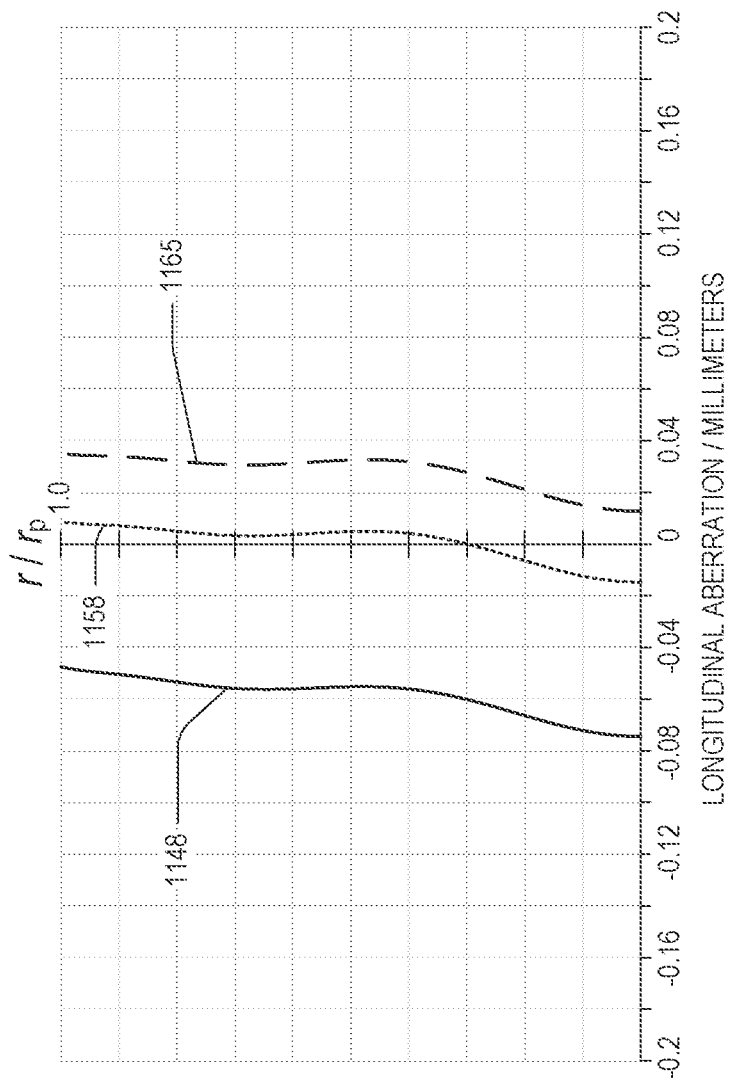
FIG. 11 is a plot of the longitudinal aberration of the compound lens within the imaging system of FIG. 9.

FIG. 11 is a plot of the longitudinal aberration of compound lens 900 within imaging system 901. In FIG. 11, longitudinal aberration is plotted in units of millimeters as a function of normalized radial coordinate $r/r_p$, where $r_p$=1.5979 mm is the maximum entrance pupil radius. Longitudinal aberration curves 1148, 1158, and 1165 are computed at $\lambda_F$=486.1 nm, $\lambda_d$=587.6 nm, and $\lambda_C$=656.3 nm, respectively.

Figure 12:
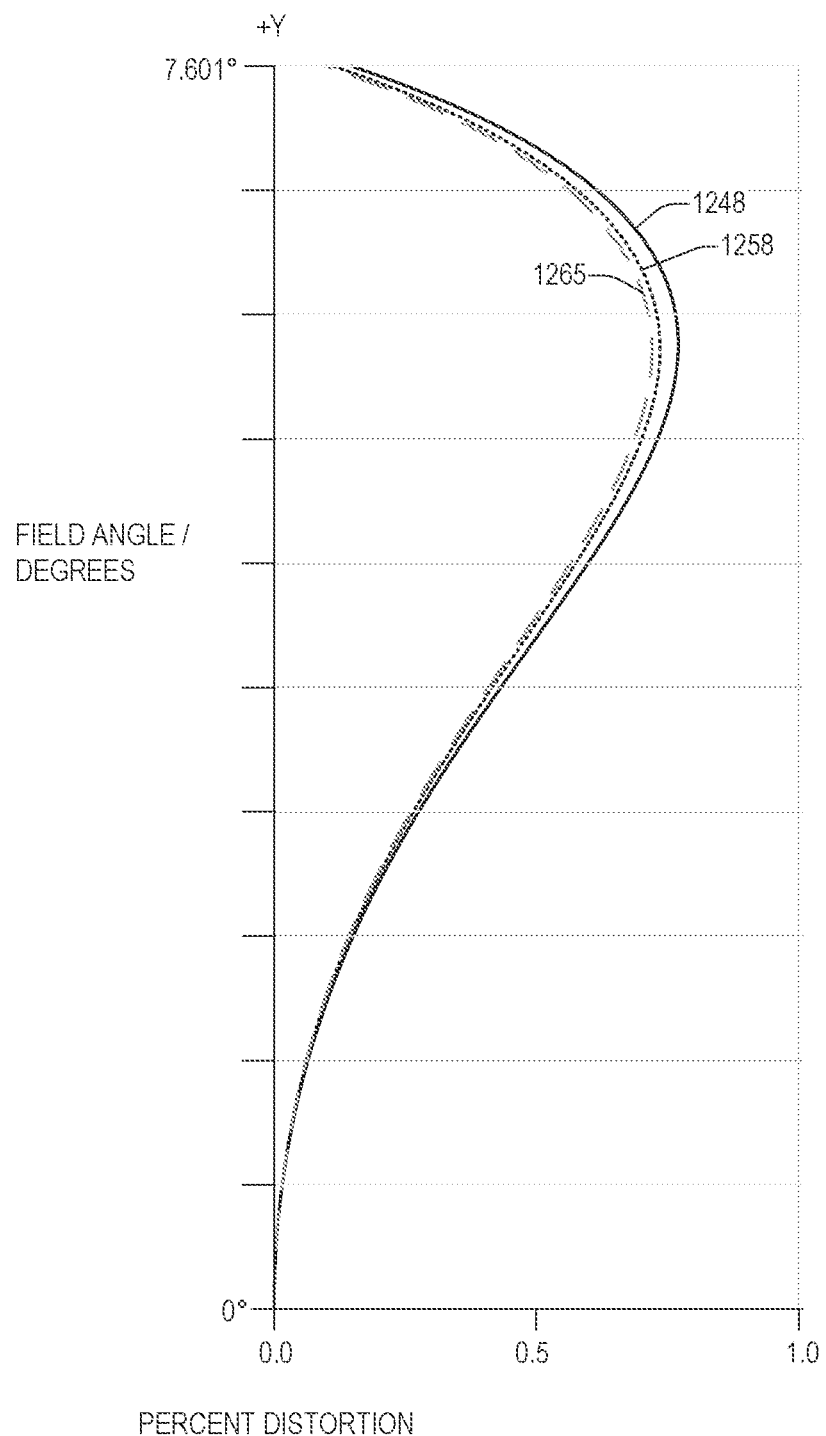
FIG. 12 is a plot of the f-theta distortion of the compound lens within the imaging system of FIG. 9.

FIG. 12 is a plot of the f-theta distortion, versus field angle, of compound lens 900 within imaging system 901. The maximum field angle plotted in FIG. 12 is $\theta_{max}$=7.601°. Distortion curves 1248, 1258, and 1265 are computed at wavelengths $\lambda_F$, $\lambda_d$, and $\lambda_C$, respectively.

Figure 13:
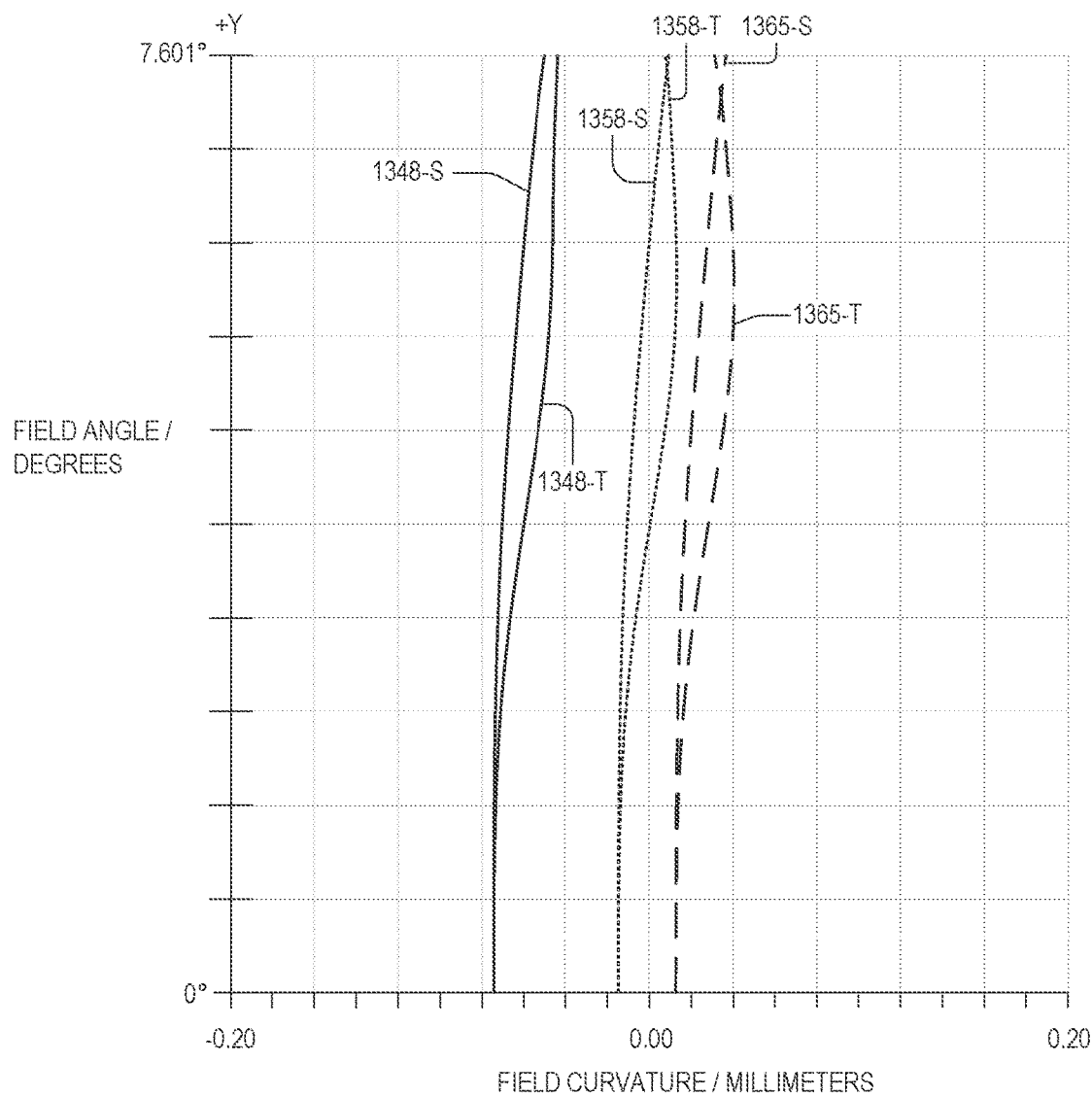
FIG. 13 is a plot of the Petzval field curvature of the compound lens within the imaging system of FIG. 9.

FIG. 13 is a plot of the Petzval field curvature, as a function of field angle, of compound lens 900 within imaging system 901. The field curvature is plotted for field angles between zero and $\theta_{max}$=5.103°. Field curvature 1348-S and field curvature 1348-T (solid lines) are computed at wavelength $\lambda_F$ in the sagittal and tangential planes, respectively. Field curvature 1358-S and field curvature 1358-T (short-dashed lines) are computed at wavelength $\lambda_d$ in the sagittal and tangential planes, respectively. Field curvature 1365-S and field curvature 1365-T (long-dashed lines) correspond to field curvature at wavelength $\lambda_C$ in the sagittal and tangential planes, respectively.

Figure 14:
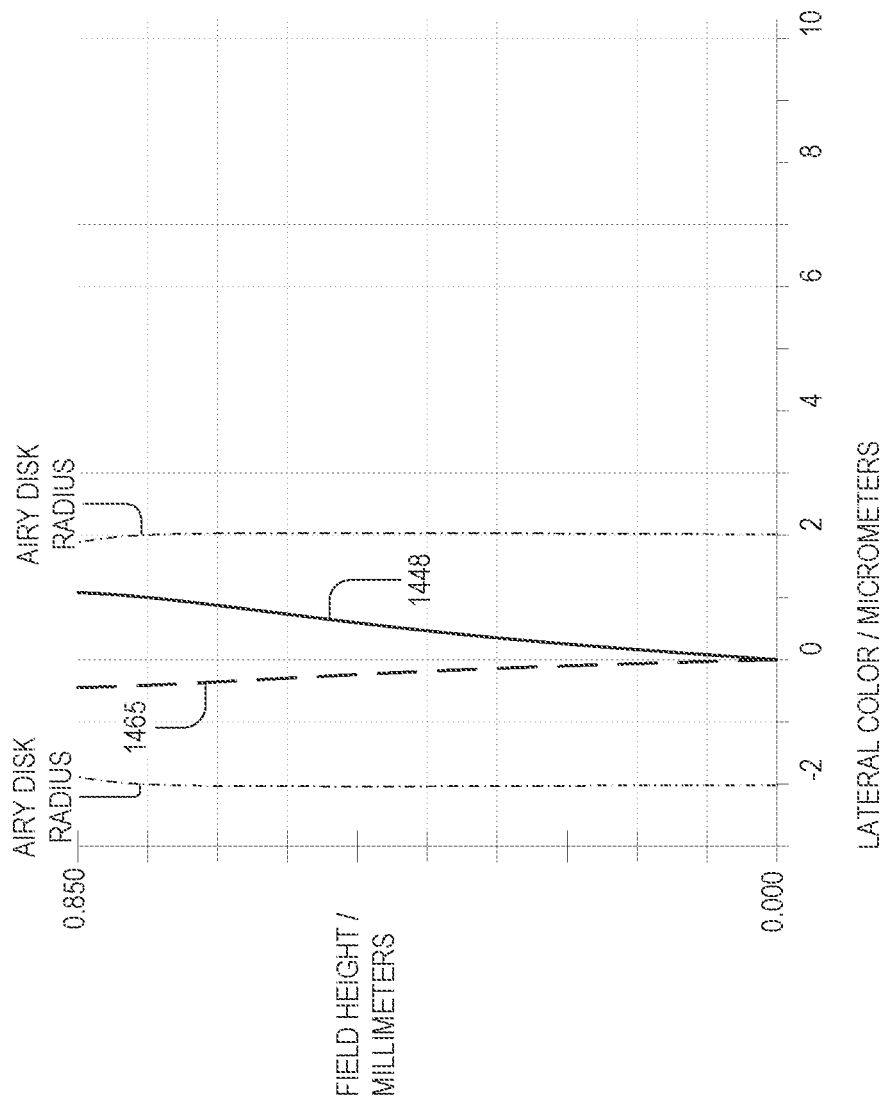
FIG. 14 is a plot of the lateral color error of the compound lens within the imaging system of FIG. 9.

FIG. 14 is a plot of the lateral color error, also known as transverse chromatic aberration, versus field height of compound lens 900 within imaging system 901. Field height ranges from $h_{min}$=0 (on-axis) to $h_{max}$=0.850 mm in image plane 378 Lateral color is referenced to $\lambda_d$=587.6 nm: the lateral color for $\lambda_d$ is zero for all field heights. Lateral color 1448 is computed at wavelength $\lambda_F$. Lateral color 1465 is computed at wavelength $\lambda_C$.

Features described above as well as those claimed below may be combined in various ways without departing from the scope hereof. The following examples illustrate some possible, non-limiting combinations:

(A1) A four-surface narrow field-of-view (FOV) compound lens for producing an image of an object at an image plane of an imaging system is disclosed. In an embodiment, the compound lens includes a first biplanar substrate between a first lens and a second lens, the first lens being plano-convex and the second lens being plano-concave. The compound lens also includes a second biplanar substrate between a third lens and a fourth lens, the third lens being plano-convex and the fourth lens being plano-concave. The first lens, the second lens, the third lens, and the fourth lens have a common optical axis. The second lens and third lens are between the first biplanar substrate and the second biplanar substrate. The first lens has a first planar surface on a first side of the first biplanar substrate and is formed of a material having a first Abbe number. The second lens has a second planar surface on a second side of the first biplanar substrate opposite the first side and is formed of a material having a second Abbe number. The third lens has a third planar surface on a first side of the second biplanar substrate and is formed of a material having a third Abbe number. The fourth lens has a fourth planar surface on a second side of the second biplanar substrate opposite the first side and is formed of a material having a fourth Abbe number. The first Abbe number exceeds the second Abbe number and the third Abbe number exceeds the fourth Abbe number.

(A2) In the compound lens denoted as (A1), each of the first Abbe number and the third Abbe number may exceed 50, and each of the second Abbe number and the fourth Abbe number may be less than 35.

(A3) In any compound lens denoted as one of (A1) and (A2), the first lens may have a focal length F1, the second lens may have a focal length F2, wherein the ratio F1/F2 satisfies −0.32<F1/F2<−0.18.

(A4) In any compound lens denoted as one of (A1) through (A3), the third lens may have a focal length F3, the fourth lens may have a focal length F4, the ratio F4/F3 satisfying −0.72<F4/F3<−0.48.

(A5) In any compound lens denoted as one of (A1) through (A4), the first lens, the first biplanar substrate, the second lens, the third lens, the second biplanar substrate, and the fourth lens collectively may have an effective focal length $f_{\mathit{eff}}$ such that the image is formed at the image plane located a distance T from an intersection of the optical axis and an object-side convex surface of the first lens, and the ratio $f_{\mathit{eff}}/T$ satisfies $0.85<f_{\mathit{eff}}/T<0.95$.

(A6) In any compound lens denoted as one of (A1) through (A5), the second planar surface may function as an aperture stop.

(A7) In any compound lens denoted as one of (A1) through (A6), the first biplanar substrate may have a width exceeding a diameter of the second planar surface.

(A8) In any compound lens denoted as one of (A1) through (A7), at least one of the first lens, the second lens, the third lens, and the fourth lens may be a singlet lens.

(A9) In any compound lens denoted as one of (A1) through (A8), the first biplanar substrate, the second lens, the third lens, the second biplanar substrate, and the fourth lens may collectively have an effective focal length between six millimeters and nine millimeters.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A four-surface narrow field-of-view (FOV) compound lens for producing an image of an object at an image plane of an imaging system, the compound lens comprising:
   a first biplanar substrate between a first lens and a second lens, the first lens being plano-convex and the second lens being plano-concave; and
   a second biplanar substrate between a third lens and a fourth lens, the third lens being plano-convex and the fourth lens being plano-concave,
   the first lens, the second lens, the third lens, and the fourth lens having a common optical axis,
   the second lens and third lens being between the first biplanar substrate and the second biplanar substrate,
   the first lens having a first planar surface on a first side of the first biplanar substrate and being formed of a material having a first Abbe number,
   the second lens having a second planar surface on a second side of the first biplanar substrate opposite the first side and being formed of a material having a second Abbe number,
   the third lens having a third planar surface on a first side of the second biplanar substrate and being formed of a material having a third Abbe number,
   the fourth lens having a fourth planar surface on a second side of the second biplanar substrate opposite the first side and being formed of a material having a fourth Abbe number,
   the first Abbe number exceeding the second Abbe number and the third Abbe number exceeding the fourth Abbe number.

2. The compound lens of claim 1, each of the first Abbe number and the third Abbe number exceeding 50, each of the second Abbe number and the fourth Abbe number being less than 35.

3. The compound lens of claim 1, the first lens having a focal length F1, the second lens having a focal length F2, the ratio F1/F2 satisfying 0.32<F1/F2<−0.18.

4. The compound lens of claim 1, the third lens having a focal length F3, the fourth lens having a focal length F4, the ratio F4/F3 satisfying 0.72<F4/F3<−0.48.

5. The compound lens of claim 1, the first lens, the first biplanar substrate, the second lens, the third lens, the second biplanar substrate, and the fourth lens collectively having an effective focal length $f_{\mathit{eff}}$ such that the image is formed at the image plane located a distance T from an intersection of the optical axis and an object-side convex surface of the first lens, and the ratio $f_{\mathit{eff}}/T$ satisfying $0.85<f_{\mathit{eff}}/T<0.95$ for limiting distance T.

6. The compound lens of claim 1, the second planar surface functioning as an aperture stop.

7. The compound lens of claim 1, the first biplanar substrate having a width exceeding a diameter of the second planar surface.

8. The compound lens of claim 1, at least one of the first lens, the second lens, the third lens, and the fourth lens being a singlet lens.

9. The compound lens of claim 1, the first lens, the first biplanar substrate, the second lens, the third lens, the second biplanar substrate, and the fourth lens collectively having an effective focal length between six millimeters and nine millimeters.

10. The compound lens of claim 1, having an f-number between 2.5 and 3.5.

11. A four-surface narrow field-of-view (FOV) compound lens for producing an image of an object at an image plane of an imaging system, the compound lens comprising:
    a first biplanar substrate between a first lens and a second lens, the first lens being plano-convex and the second lens being plano-concave; and
    a second biplanar substrate between a third lens and a fourth lens, the third lens being plano-convex and the fourth lens being plano-concave,
    the first lens, the second lens, the third lens, and the fourth lens having a common optical axis,
    the second lens and third lens being between the first biplanar substrate and the second biplanar substrate,
    the first lens having a first planar surface on a first side of the first biplanar substrate, a focal length F1, and being formed of a material having a first Abbe number,
    the second lens having a second planar surface on a second side of the first biplanar substrate opposite the first side, a focal length F2, and being formed of a material having a second Abbe number,
    the third lens having a third planar surface on a first side of the second biplanar substrate, a focal length F3, and being formed of a material having a third Abbe number,
    the fourth lens having a fourth planar surface on a second side of the second biplanar substrate opposite the first side, a focal length F4, and being formed of a material having a fourth Abbe number,
    the ratio F1/F2 satisfying −0.32<F1/F2<−0.18,
    the ratio F4/F3 satisfying −0.72<F4/F3<−0.48, the first Abbe number and the third Abbe number each exceeding 50, the second Abbe number and the fourth Abbe number each being less than 35, the first lens, the first biplanar substrate, the second lens, the third lens, the second biplanar substrate, and the fourth lens collectively having an effective focal length $f_{eff}$ such that the image is formed at the image plane located a distance T from an intersection of the optical axis and an object-side convex surface of the first lens, and the ratio $f_{eff}/T$ satisfying $0.85<f_{eff}/T<0.95$ for limiting distance T.

12. The compound lens of claim 11, the second planar surface functioning as an aperture stop.

13. The compound lens of claim 11, the first biplanar substrate having a width exceeding a diameter of the second planar surface.

14. The compound lens of claim 11, the first lens, the second lens, the third lens, and the fourth lens each being a singlet lens.

15. The compound lens of claim 11, the first lens, the first biplanar substrate, the second lens, the third lens, the second biplanar substrate, and the fourth lens collectively having an effective focal length between six millimeters and nine millimeters.

* * * * *